United States Patent Office 3,168,124
Patented Feb. 2, 1965

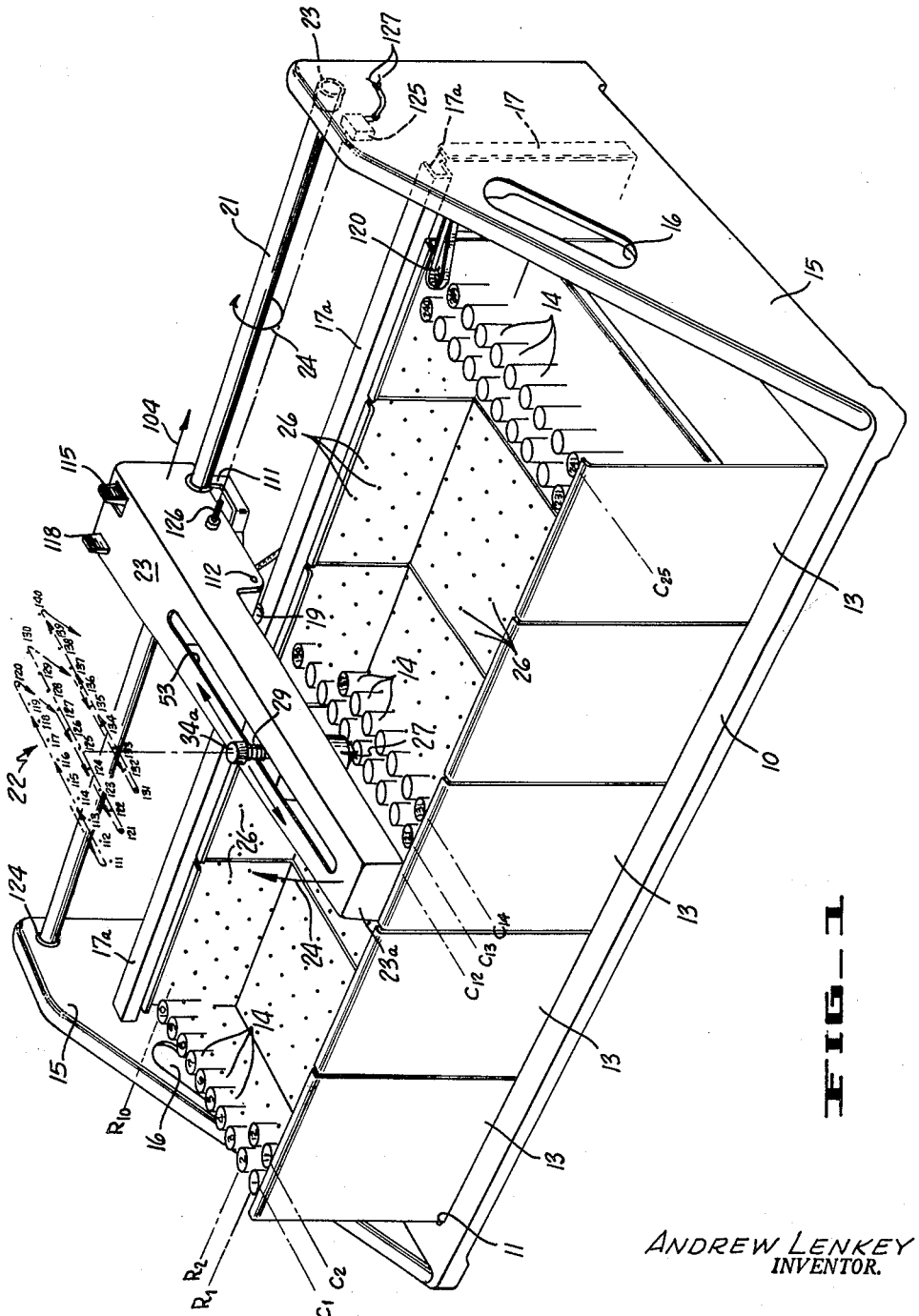

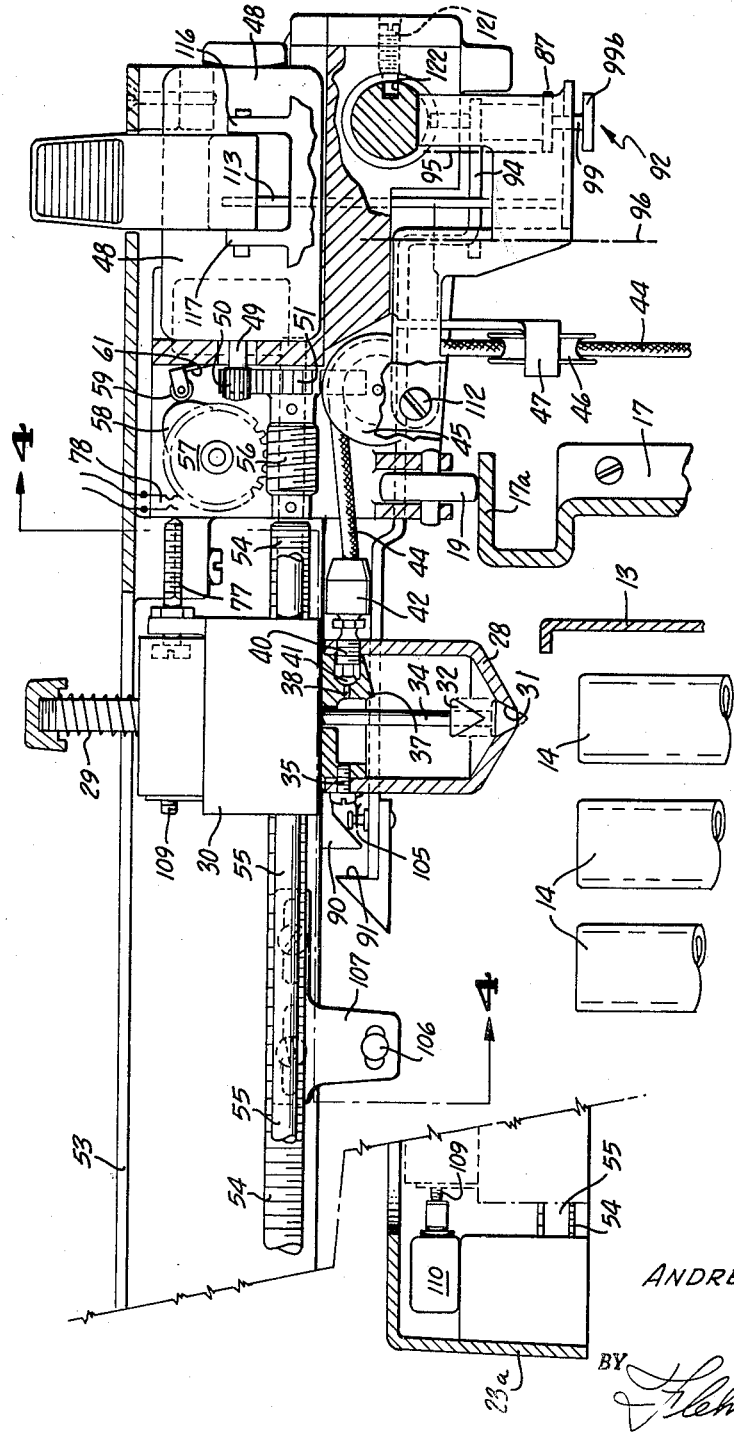

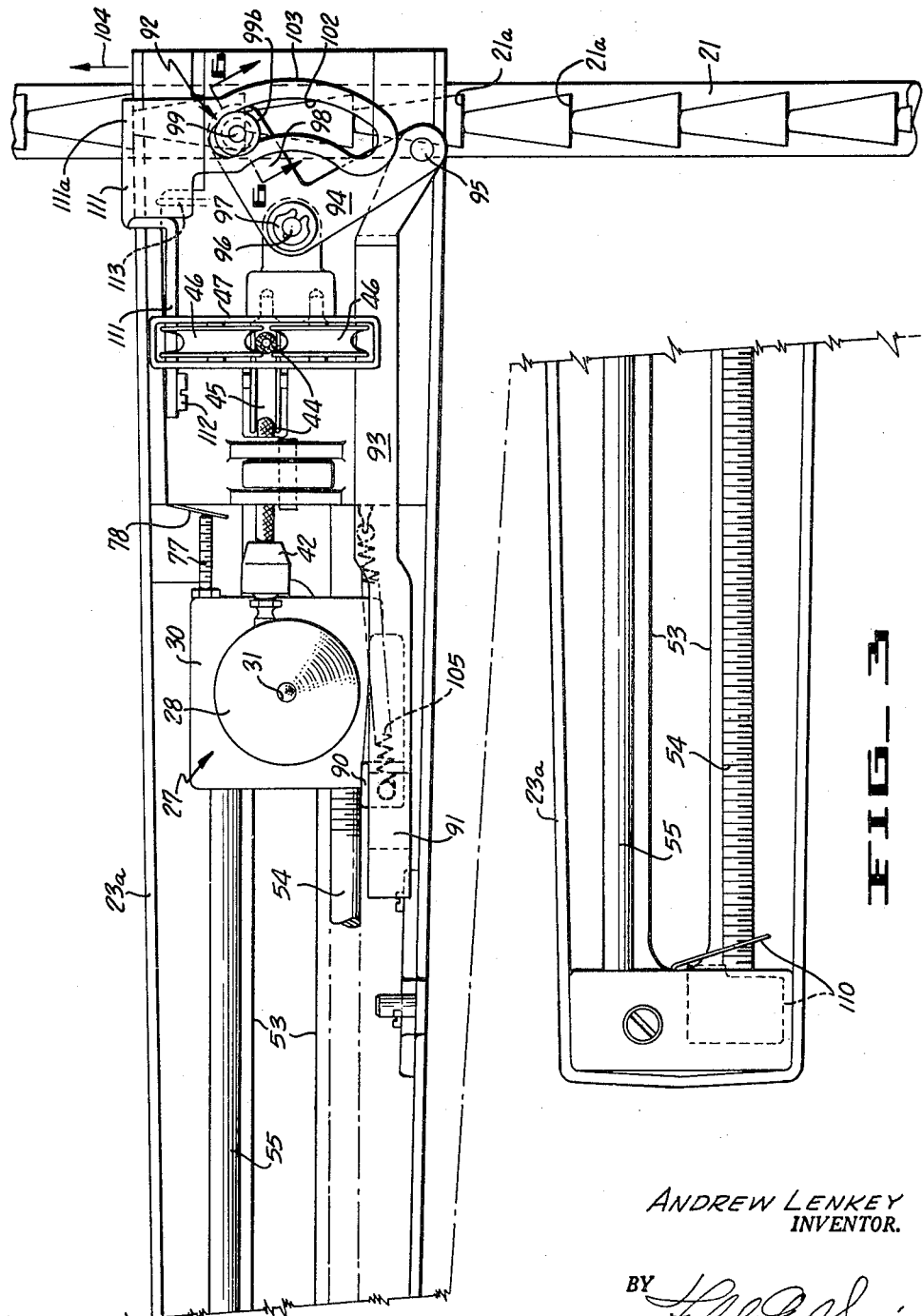
FIG_3

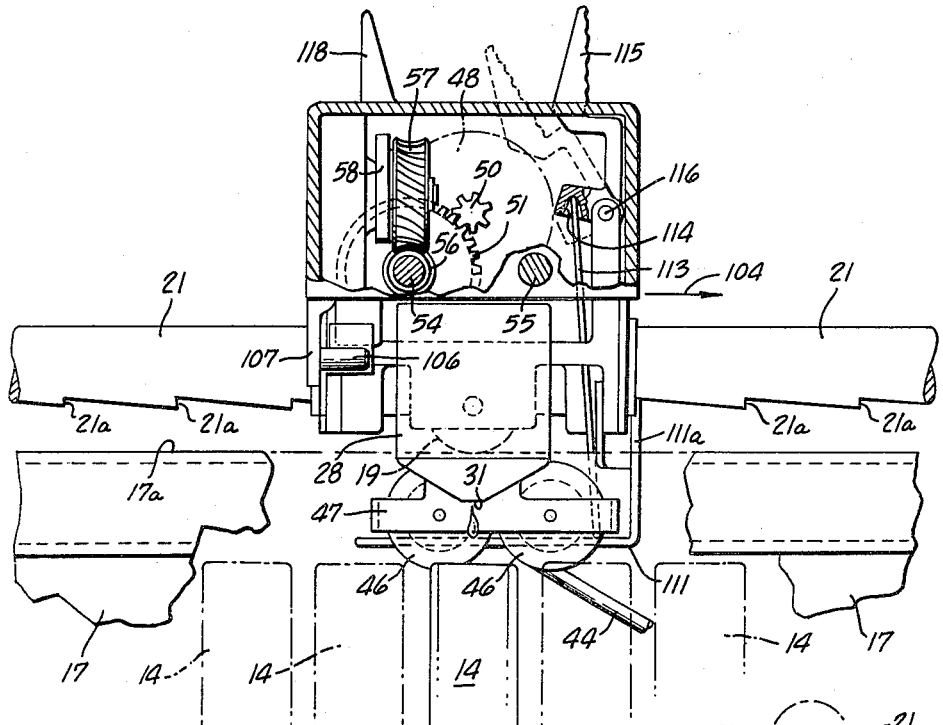
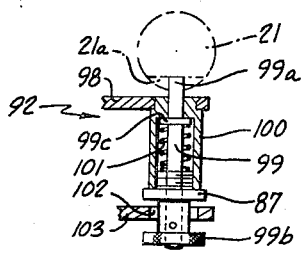
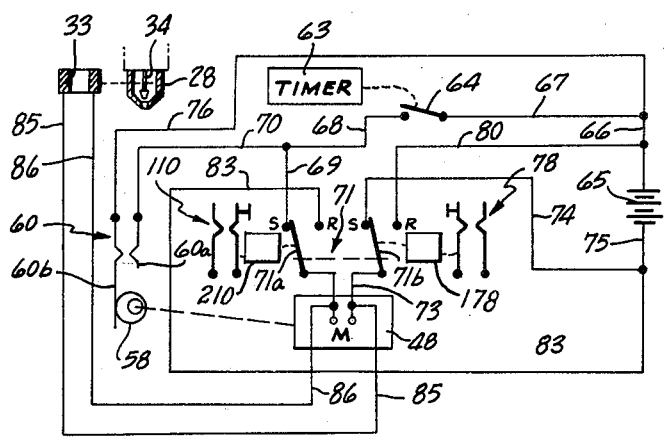

3,168,124
FRACTION COLLECTOR
Andrew Lenkey, Menlo Park, Calif., assignor to Beckman Instruments, Inc., a corporation of California
Filed Nov. 13, 1961, Ser. No. 151,833
11 Claims. (Cl. 141—284)

This invention relates to fluid material sampling apparatus and more particularly to such apparatus as are referred to as "fraction collectors."

In many applications and notably in chemical research, it is necessary to examine fluids in process at various temporal stages, usually at successive predetermined sampling periods. In order to achieve this sampling, so-called "fraction collectors" have been developed which acquire a portion of the fluid material to be examined at the above times and dispense the sample into a test tube or other suitable container.

Apparatus of this kind has usually been arranged to progressively rotate a circular array of test tubes with respect to a dispensing station and accordingly such apparatus is significantly limited as to the number of samples which can be taken commensurate with a device of reasonable size. Efforts to increase the number of samples to be taken have been directed towards providing the circular array with additional test tubes aligned in concentric circular fashion.

In a circular array having more than one circle of test tubes, it will be readily appreciated that as the array is advanced in uniform rotational increments under control of a timer, the linear displacement at the test tube positions nearest the center of the array will be less than at those nearest the outer circumference. Therefore, unless further mechanism is included to compensate for this difference in linear displacement based on radial location, the number of test tubes in each circle is required to be the same, thereby inefficiently using the array area. Furthermore, apparatus of a generally circular configuration usually wastes shelf space by occupying a square storage area. Accordingly, thet circular configuration is considered to have the disadvantage of low test tube capacity relative to the shelf space required to store or use such a configuration.

Another approach to the problem has been a rectangular array of test tubes positioned with respect to a dispensing station, and arranged to move in boustrophedon fashion, i.e. in a manner analogus to the turning movements of a plow cultivating a field wherein alternate lines are directed in opposite directions. Filling of test tubes in this manner obviously presents a confusing identification pattern incompatible with the usual arrangement of successively numbered items. This problem of an illogical sampling pattern is considerably aggravated when it is understood that the sampling test tubes are ordinarily stored in a conventional scanning pattern wherein each order of digits increases progressively by position in only a single direction. Accordingly, the arrangement in which the test tubes are sampled, being different from the arrangement in which the test tubes are usually stored upon a shelf, can cause confusion unnecessarily in going from one location to the other. In short, since the dominant pattern of scanning numbered items of increasing degree corresponds to the usual pattern of reading from left to right and top to bottom used by most English speaking people, it is an object of the present invention to provide a fraction collector wherein successive samples of material in fluid form are collected and distributed in containers in an arrangement corresponding to a normal reading scanning pattern.

For purposes of this disclosure, a normal reading scanning pattern will be considered to be a pattern wherein integer values in each of several orders of digital positions progressively increase in a direction common to all orders. Thus, a normal reading scanning pattern moves substantially in the same manner as the scanning movement of a television raster scan.

It is an object of the invention to provide a fraction collector wherein the dispensing apparatus steps in predetermined increments in a common direction for each of several orders of position together with a "retrace" movement to return it to the lowest numbered position of the next greater order of positions.

Where fraction collectors of the kind being considered are used they very often are stored under refrigeration in commercial refrigerators equipped with a number of shelves. Furthermore, it is not unusual to need to remove a particular test tube from the array after it has collected its sample. According to the present invention it is possible to manually remove any test tube from the array during the sample collecting operation without interfering with the latter. Furthermore a feature of the present invention is that a rack of test tubes is available for removal from the apparatus while it is stored between adjacent shelves of a refrigerator.

Therefore it is another object of the invention to provide a fraction collector wherein any selected test tube can be removed without interfering with the sample collecting procedure.

Other objects, advantages and features of the invention will be apparent from the following detailed description when considered together with the accompanying drawings.

In the drawings:

FIGURE 1 is an isometric perspective view of the apparatus generally;

FIGURE 2 is a view of the transport arm of the invention partially in section taken substantially along a longitudinal center line thereof;

FIGURE 3 is a plan view of the transport arm taken from beneath with some parts removed to more clearly present the major components;

FIGURE 4 is an end view of the transport arm partially in section taken substantially along the line 4—4 of FIGURE 2;

FIGURE 5 is a schematic wiring diagram of the circuit for operating the invention, and FIGURE 6 is a vertical section taken along the line 6—6 of FIGURE 3.

The apparatus as shown in FIGURE 1, comprises a base 10 provided with a recessed tray or rack receiving portion 11 serving to retain an array 25 of five removable racks 13 of test tubes 14. Test tubes 14 are positioned orthogonally in racks 13 by columns C1, C2, C3 . . . to C25 and rows R1, R2, R3 . . . to R10. Base 10 is provided with a pair of side panels 15, each having a hand hole 16. A vertical divider member or back panel 17 provides a separating back wall or partition immediately behind racks 13. The upper edge of panel 17 is formed into a resilient crook-shaped member 17a as best seen in FIGURE 2 to provide a support way for a roller support 19. The upper corners of side panels 15 are joined by a rotatable guide rod or register bar 21. The underside of bar 21 includes a series of notches or abutment 21a corresponding to columns C1 . . . C25 and which cooperate with a detent 111.

Above array 25 in FIGURE 1 is a pattern 22 indicative of the movement of the fluid delivering unit 27 of the apparatus. As shown, pattern 22 has been correlated with columns C12, C13 and C14 which includes test tubes numbered #111 through #140. Pattern 22 thus is projected directly above the test tubes of columns C12–C14 and by inspection thereof it can be observed that the movement of unit 27 steps inwardly from the distal end 23a of a traverse arm 23. In the columnar position (C13) shown in FIGURE 1 the inward stepping movement commences with test tube #121 and progresses from one test tube 14 to the next. Still referring to pattern 22, upon leaving test tube 130 in row R10, unit 27 moves directly to test tube 131 located at row R-1 and column C-14. As represented, the foregoing style of movement, which is to be distinguished from a boustrophedon movement, continues throughout the entire array 25.

In FIGURE 1, all test tubes have not been shown in full for purposes of clarity of illustration. However, their positions are represented by dots 26 denoting the centers of those of the test tubes 14 which have not been shown. Finally, it should be noted as indicated by the arrows 24 that traverse arm 23 is arranged to swing up with register bar 21 in a plane perpendicular thereto. Such lifting up of arm 23 accommodates removal of any individual test tube 14 from racks 13.

General

In general, the apparatus is arranged to be manually set to orient a fluid dispensing unit 27 directly above any column of test tubes, for example over tube #1, i.e. at position C1, R1 so that unit 27 is in position to step inwardly along arm 23 from one test tube to the next in ascending order. Means have been provided for closing the dispensing unit 27 during movements from one test tube to the next. After filling the highest numbered test tube in column C1, the apparatus is arranged to return unit 27 outwardly along arm 23 in a single "retrace" step. During the outward movement of unit 27, arm 23 moves laterally one increment to the right (as shown in FIGURE 1) so that as unit 27 again commences to step incrementally from row R1 to row R10 it will fill the test tubes of column C2.

Fluid dispensing unit

With the foregoing general operation of the apparatus in mind, the particular structure will now be described. Fluid dispensing unit 27 includes a bucket 28 depending downwardly from a block member 30. The distal end of bucket 28 is conical and provided with an opening 31 controlled by a valve 32 which is normally held open by the spring bias means 29 of a push type solenoid 33 (shown only in FIGURE 5). Valve 32 is provided with a valve stem 34 activated by solenoid 33, or manually at 34a.

The upper end of bucket 28 is secured, as by screw 35, to a support plate 37 which includes a lead-in port 38 sealed by a projection 41 of a drilled plug 40. A suitable coupling 42 connects plug 40 to a flexible hose 44 which, it will be understood, is connected to deliver quantities of fluid material to bucket 28 for deposit in test tubes 14. Tube 44 leads to the right as shown in FIGURE 2 over a grooved pulley 45 mounted on an axis transverse of arm 23. From pulley 45, hose 44 passes between a pair of guide pulleys 46 supported by a frame 47 and then leads to a source of fluid material (not shown).

Columnar movement

Dispensing unit 27 is arranged to be stepped to the right as shown in FIGURE 2 through a succession of incremental displacements, each equal to the spacing between test tubes 14. In order to perform this function, a motor 48 mounted to the rear of arm 23 is provided with a drive shaft 49 having a pinion gear 50 thereon. Pinion gear 50 drives a bull gear 51, either clockwise or counterclockwise depending upon the electrical connections made to motor 48. Block member 30 is supported for movement along arm 23 in a longitudinal opening 53 by a lead screw 54 and a rod or way 55, it being understood that block member 30 includes a coacting threaded portion (not shown) so that rotation of lead screw 54 will drive it therealong. To the right of lead screw 54, as shown in FIGURE 2, and coaxially therewith, a worm 56 is provided to be driven by rotation of gear 51. Worm 56 coacts with a worm gear 57. A cam 58 made fast to the side of worm gear 57 rotates to control a holding switch 60 (see FIG. 5) operated by a cam follower 59. Switch 60 is normally closed so that rotation of cam 58 serves to open the contacts.

As shown best in FIGURE 5, the operation of the apparatus is under the control of an interval timer 63 of any suitable construction. Timer 63 is arranged to act upon a step actuating switch 64 controlling motor 48 by completing a circuit including a power supply, such as battery 65, a lead 66 connected to lead 67 through switch 64 shown normally open, one terminal of which connects with a lead 68, a lead 69 terminating at one contact point "S" of a double pole-double throw motor reversing switch 71. Via one armature 71a of switch 71, the stepping circuit is completed to motor 48 and return is made to battery 65 via lead 73, the other armature 71b of switch 71, and leads 74 and 75. Accordingly, closing switch 64 energizes motor 48 in a direction which will step dispensing unit 27 from a low numbered row to a higher numbered row (i.e. in a direction away from the outer end 23a of arm 23).

At the same time, cam 58 will be rotated under action of worm gear 56 so as to close holding switch 60 to shunt switch 64, as shown in FIGURE 5 via a circuit in parallel with switch 64. This shunt circuit includes a lead 70 connected to lead 68 and one contact 60a. The other contact 60b of switch 60 is urged into engagement with contact 60a and is connected via lead 76 directly to lead 66. Therefore, as motor 48 is driven far enough to cause cam 58 to close the contacts of switch 60, a holding circuit by-passing switch 64 is effected and motor 48 continues to run for one revolution of cam 58 whereupon it again opens the contacts of switch 60. The gearing is such that one rotation of cam 58 is equivalent to a linear increment of displacement of dispensing unit 27 equal to the distance between test tube centers.

At the top of block 30 and supported therefrom is an adjustable screw 77 which serves to actuate a limit switch 78 shown only schematically in FIGURE 2 as well as in FIGURE 5. This limit switch 78 serves to reverse the drive of motor 48 after unit 27 has filled a test tube 14 in row R10. Thus, assuming dispensing unit 27 is positioned directly over a test tube in row R10 and interval timer 63 closes switch 64, motor 48 will be driven in the same direction as before. However, screw 77 will close the contacts of switch 78 which are normally open thereby operating suitable means (represented by square 178 in FIGURE 5) such as a relay to shift switch 71 to place motor 48 into a "retrace" scan circuit including battery 65, lead 80, one retrace contact 81 labeled "R" of switch 71, blade 71b, lead 73 and thence to motor 48. The other side of motor 48 is connected via blade 71a to the other retrace contact 82 to lead 83 and return to battery 65 via lead 75.

Inasmuch as valve 32 of dispensing unit 27 is normally open, it is necessary to close opening 31 whenever unit 27 moves from one test tube to the next. Therefore, a valve control circuit in parallel with motor 48 has been provided. This circuit includes a pair of leads 85, 86 coupled to the leads of motor 48, and connected to operate solenoid 33 which controls valve 32. Therefore, any time motor 48 is energized, regardless of direction, valve 32 will be pushed shut.

From the foregoing it can be seen that as screw 77 closes limit switch 78, switch 71 is conditioned to reverse the drive of motor 48 and at the same time operate solenoid 33, which in turn closes dispensing unit valve 32. Thus, on the outward move of dispensing unit 27 no fluid will escape from bucket 28.

Lateral arm movement

As unit 27 is driven outwardly along arm 23, a depending abutment 90 supported beneath block 30 strikes an arm catch and release member 91 driving it to the left as shown in FIGURE 2. As shown best in FIGURE 3, member 91 is secured to a lateral movement drive link 93 which functions to laterally displace traverse arm 23 one column at a time across the array 25 of test tubes 14. Link 93 extends to the rear of traverse arm 23 and is coupled to one arm member of a bell crank 94 by a pin 95. The fulcrum of bell crank 94 is pivoted about a vertical axis through point 96 and retained thereto by a spring clip 97. The other arm 98 of bell crank 94 carries a vertically disposed pin assembly 92 for driving arm 23 laterally.

Assembly 92 is best shown in FIGURE 6 and includes a vertically extending stud 99 for engagement with one of the abutments 21a of register bar 21. Stud 99 is mounted within a sleeve 100 which is fixed at its upper end to arm member 98 of bell crank 94. Stud 99 includes a pawl portion 99a for engaging abutments 21a and a head portion 99b which is threaded to be mounted upon stud 99 at its lower end. Intermediate the ends of stud 99 a flange portion 99c is formed, below which a spring 101 is positioned. Sleeve 100 is provided with a cap 87 which screws into the lower end of sleeve 100 and is provided with a hole centrally thereof to permit stud 99 to move downwardly against the force of spring 101. The arcuate way 102 of guideway 103 is disposed intermediate cap 87 and portion 99b and sufficient clearance is provided to accommodate the vertical movements of guideway 103.

The outward movement of dispensing unit 27 causes the depending abutment 90 to engage member 91, thereby driving link 93 outwardly along traverse arm 23. As link 93 moves with unit 27, bell crank 94 is rotated clockwise as shown in FIGURE 3 urging pawl portion 99a of stud 99 against an associated abutment 21a of register bar 21. Further clockwise rotation of bell crank 94 laterally displaces traverse arm 23 along register bar 21 in the direction of arrow 104. Link 93 is spring loaded against this outward movement by a spring 105 connected to a stud on link 93 and also connected to a fixed portion of arm 23. Depending from the side wall of arm 23 is an adjustable strut 107. Strut 107 mounts a release stud 106 for releasing link 93. Stud 106 is positioned directly in the path of member 91 so that outward movement of link 93 will cause the upwardly sloped face of catch 91 to be forced downwardly until member 91 is released from engagement with abutment 90 thereby permitting spring 105 to return link 93 to its original position. The extent to which link 93 is driven outwardly, and hence the amount of lateral movement of arm 23 can be adjusted by moving strut 107 slightly to insure exact columnar alignment. During the return movement of bell crank 94, assembly 92 moves counterclockwise along way 102 until it falls over the next succeeding abutment 21a of register bar 21. Thus, motor 48 powers the lateral movement and spring 105 merely re-sets the bell crank.

*Repositioning to first tube in succeeding column*

The outward movement of dispensing unit 27 continues until an adjustable screw 109 mounted atop block 30 contacts an outer limit switch 110 at the end of its outward travel. As represented in FIGURE 5, closing of the contacts of switch 110 by screw 109 acts through a suitable means (represented by square 210 in FIGURE 5) such as a relay (not shown) to shift switch 71 to re-establish the stepping circuit controlled by interval timer 63. Outer limit switch 110 is spaced less than the distance between test tubes from row R–1 so that re-establishment of the stepping circuit does not find cam 58 in a position which would cause it to hold switch 60 open. Thus, no additional timer control signal is necessary to advance unit 27 back to the right.

*Detent assembly and manual release*

In order to positively position arm 23 at each abutment 21a of register bar 21 a detent member 111 has been fastened by a screw 112 to pivot from the side cover of arm 23 against tension of a spring not shown. The detent portion of member 111a is formed by an upward extension of bell crank guide member 103. Detent 111 can be forced out of engagement with any of abutments 21a by a vertically extending push rod 113 shown best in FIGURE 4. The upper end of push rod 113 is received by a notch 114 in the free end of a manual detent release lever 115 which is pivoted around a pin 116 mounted in a trunnion 117 attached to the frame of arm 23. A fixed finger grip 118 is formed atop arm 23 so that lever 115 can be squeezed toward grip 118 to drive rod 113 downwardly to release detent portion 111a from abutments 21a.

Referring to FIGURE 6, wherein assembly 92 is best shown, it can be seen that downward pressure from manual release rod 113 will push member 103 downwardly against head portion 99b to pull stud 99 out of engagement with register bar 21. This same downward movement of push rod 113 also releases detent portion 111a. On the other hand, stud 99 is free to slide over abutments 21a against the force of spring 101 as stud 99 is returned counterclockwise (FIG. 3) by release of catch member 91.

By the above means, arm 23 can be positioned manually to commence operation in any of columns C–1 to C–25. Usually, however, initiation of the sampling of a fluid can be expected to commence in column C–1.

Referring to FIGURE 1, it will be noted that the position for test tube number 250 is not filled but is replaced by locating a trough 120 thereat. Trough 120 connects to a suitable reservoir for accumulating fluid from bucket 28 after the sampling process has been completed. A suitable limit switch contact 125 is provided to be operated by a screw 126, disposed on the side of arm 23. Switch 125, via connecting leads 127 acts to deenergize all circuits as well as the circuit of the pump supplying material via hose 44. These connections have not been shown as they are considered within the ordinary skills. Screw 126 does not contact switch 125 until unit 27 attempts to "retrace" beyond column C25. Otherwise, switch 125 would have deenergized motor 48 upon movement of arm 23 from column C24 to C25.

Finally, it is to be noted that arm 23 is rotatable upwardly as indicated by arrows 27 and 24 and during such rotation, alignment between register bar 21 and detent portion 111a, as well as with stud 99, is maintained by a setscrew 121 positioned in arm 23 and screwed into a longitudinal groove 122 formed in the back side of register bar 21. Bar 21 in turn is mounted for rotation at its ends 123 and 124 respectively. As thus arranged, arm 23 can be lifted from its distal end 23a without affecting the action of detent 111 or stud 99. Furthermore, if arm 23 should accidentally be dropped, the resilience of rail member 17a will absorb the shock to prevent damage to the mechanism.

*Operation*

With hose 44 suitably connected to deliver fluid to be sampled to bucket 28, arm 23 is manually moved to the left as shown in FIGURE 1, for example, to column C–1 by squeezing manual detent release lever 115 toward finger grip 118. This action releases detent portion 111a from its associated abutment 21a in register bar 21 thereby freeing arm 23 for movement to the left. Assuming hole 31 of bucket 28 to be aligned with the No. 1 test tube, i.e., at position C–1, R–1; that switch 71 is conditioned to establish the stepping circuit which includes contacts labelled "S"; and that valve 32 is open, timer 63 is started. After a predetermined interval, timer 63 closes switch 64. Closing switch 64 closes valve 32 and energizes motor 48 to establish the holding circuit through switch 60 under rotation of cam 58. At the same time, motor 48 is rotating cam 58, lead screw 54 is being rotated so as to drive unit 27 one increment to substantially the center of the next higher numbered test tube 14.

As unit 27 arrives over the center of each succeeding test tube, cam 58 opens switch 60 to deenergize motor 48 and open valve 32 by deenergizing solenoid 33. Thus, unit 27 is stopped in position to deliver fluid material to a test tube beneath until timer 63 again closes switch 64.

The above operation is repeated in the assumed example, until unit 27 has reached the last test tube in column C–1. After unit 27 has made delivery to the last test tube in column C–1, switch 64 again closes and motor 48 again drives lead screw in the same direction as before. However, adjustable screw 77 strikes limit switch 78 which effectively reverses the position of switch 71 (FIGURE 5) to establish the "retrace" circuit including posts designated "R." Energizing the retrace circuit also energizes solenoid 33 closing valve 32. The retrace circuit, as noted above, reverses the leads to motor 48 and therefore drives unit 27 outwardly along traverse arm 23.

As unit 27 moves outwardly, abutment 90 engages member 91 and carries link 93 with it. Leftward movement of link 93 as shown in FIGURE 3 rotates bell crank 94 clockwise as shown therein. Clockwise movement of bell crank 94 causes pawl portion 99a of stud 99 to bear against abutment 21a as there shown and since bar 21 cannot move laterally with respect to frame 10, arm 23 must move in the direction of arrow 102. This lateral movement of arm 23 from column C–1 to column C–2 continues until link 93 is released by disengagement of member 91 from abutment 90 as the forward face of catch 91 passes under stud 106. As link 93 is released, it moves to the right as shown in FIGURE 3 under the action of spring 105. This rightward movement restores stud 99 to bear upon the next succeeding abutment 21a.

Unit 27 continues its outward movement along arm 23 until screw 109 closes the outer limit switch 110. Closing switch 110 reverses motor control switch 71 to reverse the drive of motor 48. During the outward movement of unit 27, valve 32 has been maintained closed because solenoid 33 is in circuit with the motor 48.

Action of switch 110 reverses motor 48 to establish the stepping circuit as shown in FIGURE 5, and unit 27 moves to the right as in FIGURE 2 until cam 58 opens holding switch 60. This process is repeated until all test tubes 14 have been serviced. As unit 27 moves from test tube No. 249 to the position defined by C–25, R–10, hole 31 in bucket 28 is positioned over trough 120. Valve 32 remains open to drain material from bucket 28 into trough 120. After a short period, timer 63 will close switch 64 and the "retrace" movement will commence. However, the initial lateral advance of arm 23 will cause screw 126 to operate switch 125 deenergizing the entire operation.

While the invention has been described with respect to a preferred embodiment, it is intended that various modifications and changes in the operation and structure can be effected without departing from the scope of the invention which is intended to be limited only as defined in the following claims.

I claim:

1. A fraction collector for delivering fluid material into containers arranged in a two-dimensional array of columns and rows, said fraction collector comprising a traveling support member arranged to move in the direction of said rows, a fluid material dispensing means arranged to move along said support member in the direction of said columns means serving to automatically step said dispensing means in a first direction along said columns by predetermined increments from one container to the next, motive means serving to drive said dispensing means in a second direction opposite to said first direction after said material has been delivered to the last container in the column temporally associated with said dispensing means, the driving in said second direction continuing until the first row of containers has been reached, means for subsequently automatically resuming the stepping of said dispensing means in said first direction, and means coupled to said support member to advance said support member in the direction of said rows and into alignment with the next said column prior to resuming said stepping movement.

2. A fraction collector for delivering fluid material into container arranged in a two-dimensional array of columns and rows, said fraction collector comprising a traveling support member arranged to move in the direction of said rows, a fluid material dispensing means supported by said support member and arranged to move along said support member in the direction of said columns, means connected to automatically step said dispensing means in a first direction along said columns by predetermined increments from one container to the next and arresting the movement of said dispensing means at each to permit delivery of said fluid, drive means coupled to move said dispensing means in a second direction opposite to said first direction after said material has been delivered to the last container in the column temporally associated with said dispensing means, the movement in said second direction continuing until the first row of containers has been reached, means connected to arrest movement of said dispensing means in said second direction and to resume the stepping of said dispensing means in said first direction, and means coupled to said support member to advance said support member in the direction of said rows and into alignment with the next said column prior to resuming said stepping movement.

3. The invention according to claim 2 further including means for manually releasing said support member with respect to the columnar position of same and means serving to positively index said support member manually in registration with any of said columns.

4. The invention according to claim 2 wherein said traveling support member is further arranged to pivot about an axis running in the direction of said rows and through one end of said support member so as to permit manual raising of said support member away from said array, and means associated with said support member to maintain the columnar position of said support member during said pivotal movement.

5. The invention according to claim 4, further including electrically operated means carried by said dispensing means and serving to automatically deliver said material therefrom to each said container, the last said means further being manually operable to momentarily terminate for manually controlling the delivery of said material from said dispensing means whereby automatic delivery of said material by said dispensing means can be manually interrupted during manual movement of said support member.

6. A fraction collector for delivering fluid material into containers arranged in a two-dimensional array of columns and rows, said fraction collector comprising a traveling support member arranged to move in the direction of said rows, a fluid material dispensing means supported by said support member and arranged to move along said support member in the direction of said columns, means connected to step said dispensing means in a first direction along said columns by predetermined increments from one container to the next and to arrest the movement of said dispensing means at each to permit delivery of said fluid, drive means coupled to move said dispensing means in a second direction opposite to said first direction after said material has been delivered to the last container in the column temporally associated with said dispensing means, the movement in said second direction continuing until the first row of containers has been reached, means connected to arrest movement of said dispensing means in said second direction and to resume the stepping of said dispensing means in said first direction, and means coupled to said support member to advance said support member in the direction of said rows and into alignment with the next said column during the movement of said dispensing means in said second direction, thereby moving said dispensing means across said array in a normal scanning pattern.

7. The invention according to claim 6 wherein said drive means is connected to move said dispensing means in both said first and second directions as well as to advance said support member in the direction of said rows.

8. The invention according to claim 6 further including an opening in said dispensing means for delivering fluid therefrom, valve means coacting with said opening, and electrically operative valve control means coupled to said valve means and connected to close said opening during each incremental movement of said dispensing means.

9. The invention according to claim 8 wherein said valve control means is further connected to operate said valve means to close said opening during movement of said dispensing means in said second direction.

10. A fraction collector for delivering fluid materials into test tubes arranged in a two-dimensional array of columns and rows, said fraction collector including a guideway disposed in the direction of said rows, a traveling support arm arranged to move in the direction of said rows along said way, said way being disposed to pass through one end of said support arm, said way having a plurality of abutments defining columnar positions of said array, said way being mounted for rotation, retaining means acting to prevent rotation of said support arm with respect to said way to retain said support arm with respect to any one of said abutments, thereby permitting said arm to be manually raised about the axis of said way, a fluid material dispensing means supported by said support arm and arranged to move along said support arm in the direction of said columns, motor means connected to drive said dispensing means in a series of predetermined increments in a first direction along said columns from one test tube to the next, said motor means being coupled to move said dispensing means in a second direction opposite to said first direction after said material has been delivered to the last tube in each of said columns, a limit switch connected to reverse the drive of said motor means from said second direction to said first direction after movement of said dispensing means in said second direction has passed beyond the first row of said array, means connected to arrest movement of said dispensing means in said first direction at a position substantially overlying the center of a test tube in the first row of said test tubes, and means driven by said motor means and including a mechanical link acting between said support member and said way to advance said support member in the direction of said rows into alignment with the next said column of test tubes during the movement of said dispensing means in said second direction, whereby said dispensing means delivers fluid material to said test tubes pursuant to a normal scanning pattern.

11. The invention according to claim 10 wherein said dispensing means includes an opening for delivering fluid therefrom, valve means coacting with said opening, and circuit means coupled to said valve means and connected to close said opening during each incremental movement of said dispensing means in said first direction as well as during movement of same in said second direction.

References Cited in the file of this patent

UNITED STATES PATENTS

| | | |
|---|---|---|
| 833,988 | Valerius | Oct. 23, 1906 |
| 1,512,703 | Madden | Oct. 21, 1924 |
| 2,894,542 | Alm | July 14, 1959 |
| 2,925,801 | Bivens et al. | Feb. 23, 1960 |
| 3,023,555 | Schesch | Mar. 6, 1962 |
| 3,054,237 | Barkstrom | Sept. 18, 1962 |